UNITED STATES PATENT OFFICE.

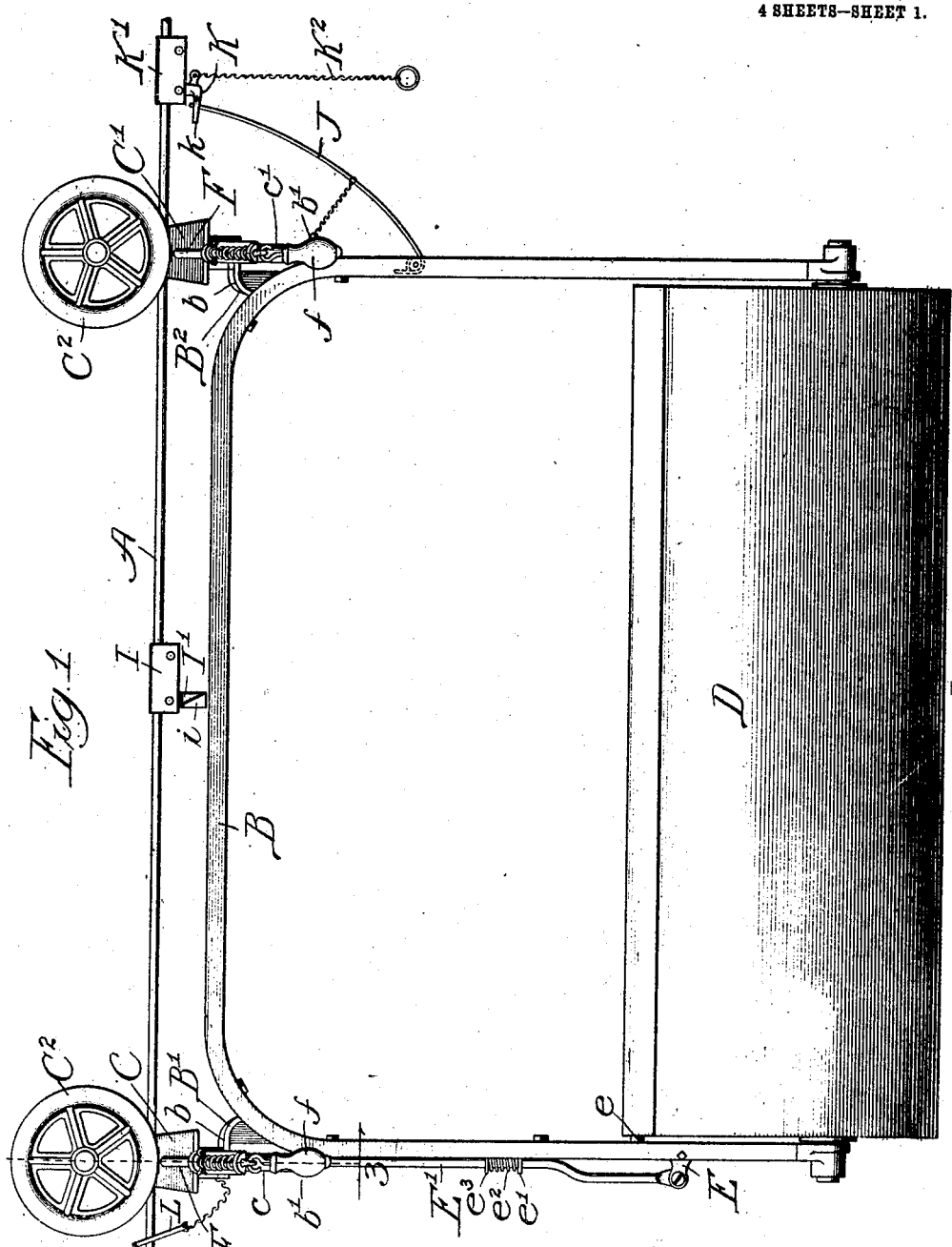

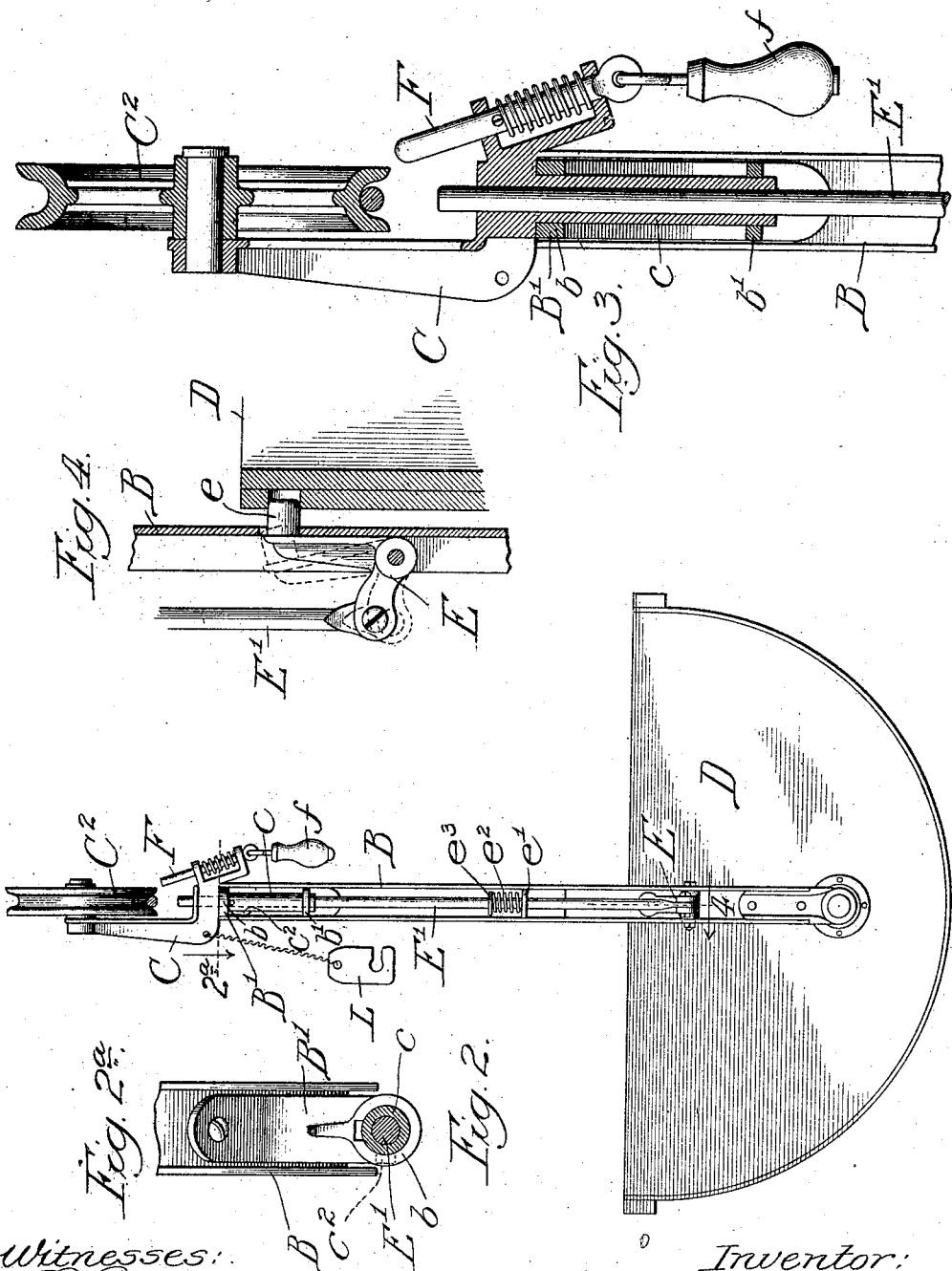

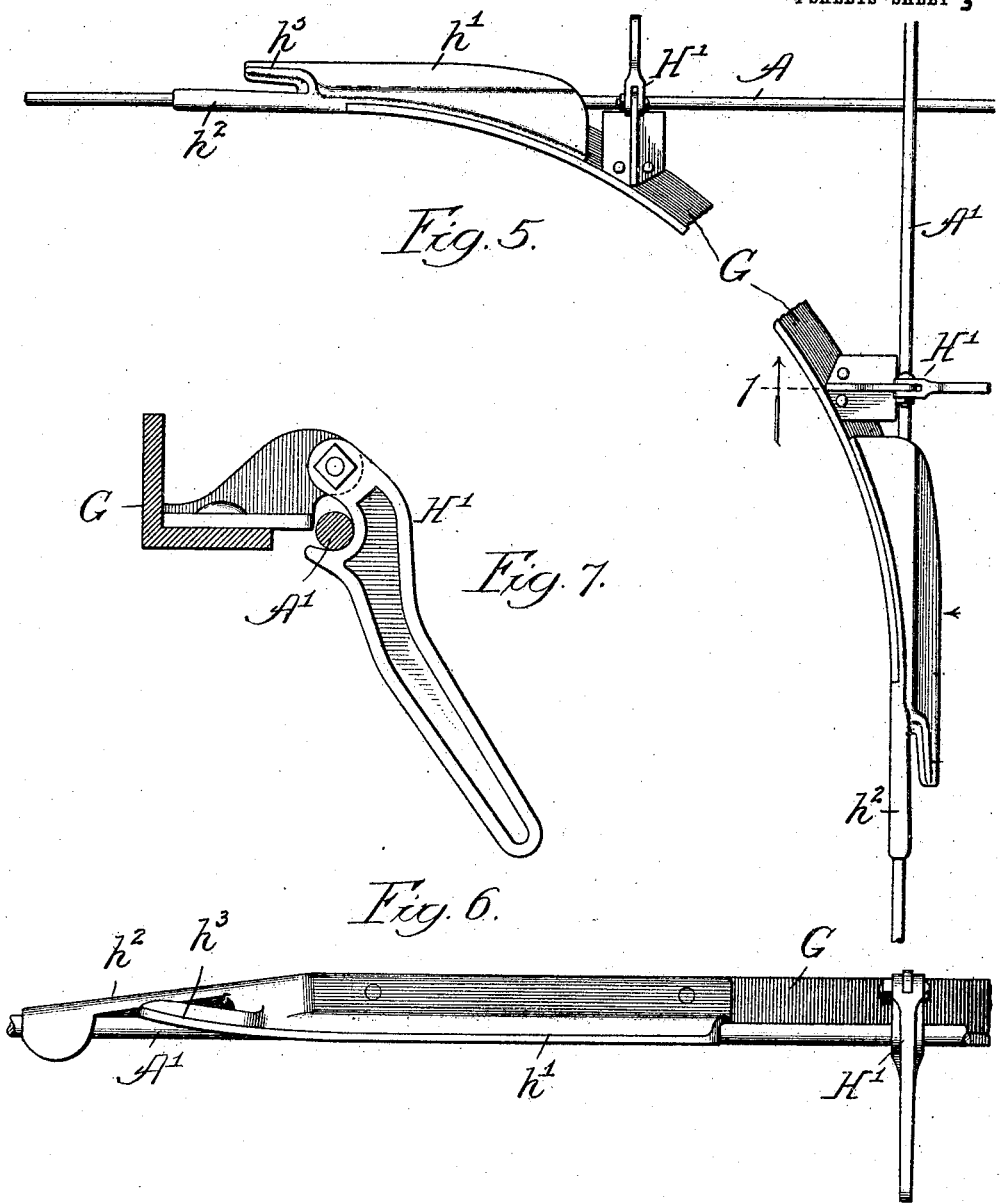

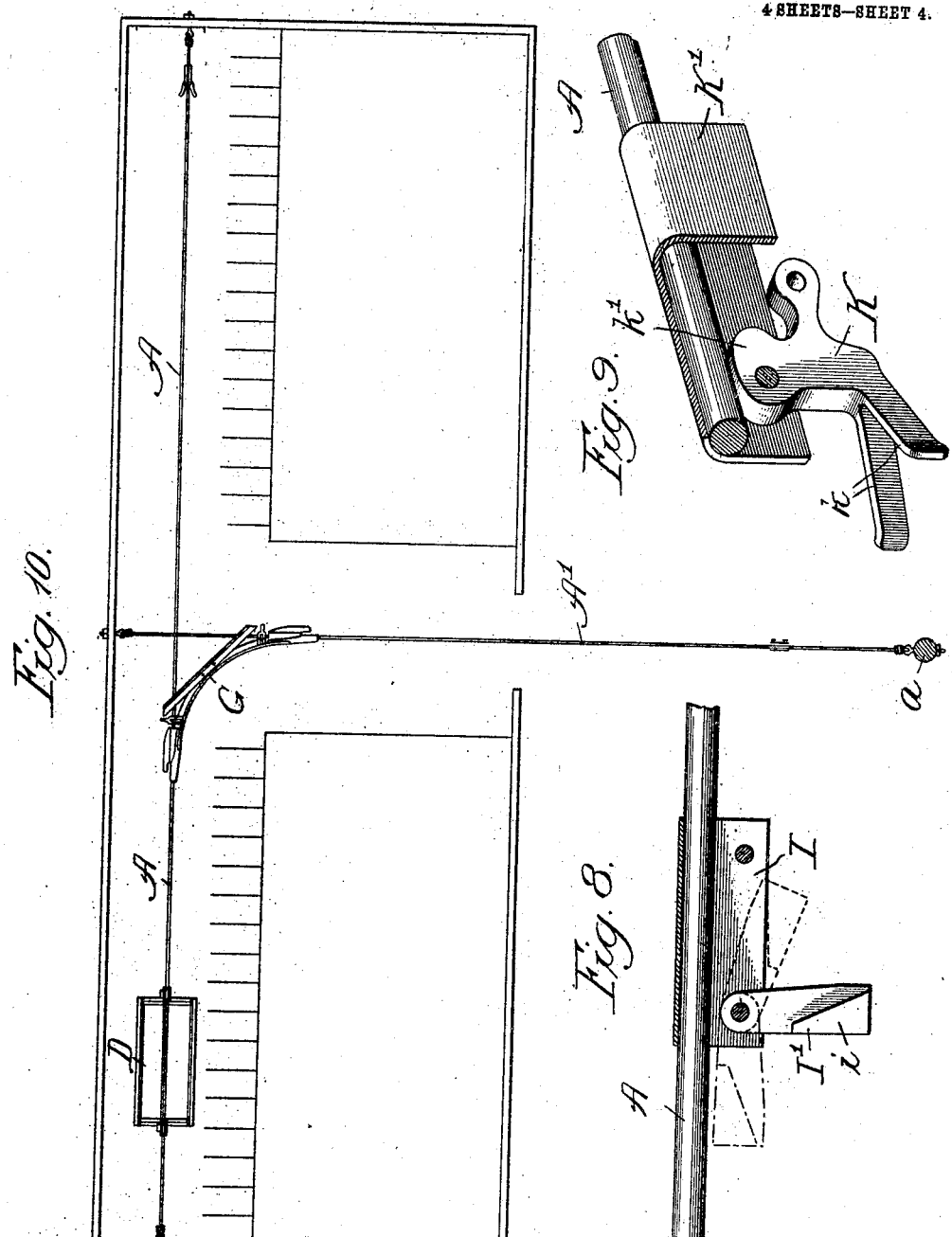

HENRY L. FERRIS, OF HARVARD, ILLINOIS, ASSIGNOR TO HUNT, HELM, FERRIS & COMPANY, OF HARVARD, ILLINOIS, A CORPORATION OF ILLINOIS.

FEED AND LITTER CARRIER.

No. 862,460.      Specification of Letters Patent.      Patented Aug. 6, 1907.

Application filed January 30, 1907. Serial No. 354,943.

*To all whom it may concern:*

Be it known that I, HENRY L. FERRIS, a citizen of the United States, residing at Harvard, in the county of McHenry and State of Illinois, have invented a new and useful Feed and Litter Carrier, of which the following is a specification.

My invention relates to certain new and useful improvements in feed and litter carriers, which are fully described and explained in the specification and shown in the accompanying drawing, in which Figure 1 is a side elevation of my improved device, showing the same in place upon a track; Fig. 2 is an end view of the device removed from the track; Fig. 2$^a$ is a section on the line 2$^a$ of Fig. 2; Fig. 3 is a detailed vertical transverse section in the line 3—3 of Fig. 1; Fig. 4 is a detailed vertical longitudinal section in the line 4—4 of Fig. 2; Fig. 5 is a top plan of the track corner; Fig. 6 is an elevation of the structure shown in Fig. 5 looking in the direction of the arrow 6 in said figure; Fig. 7 is a section in the line 7—7 of Fig. 5; Fig. 8 is a view of the tripping device, the frame therefor being cut away in vertical section and the remaining parts being shown in elevation; Fig. 9 is a perspective view showing the returning stop, a portion of the frame being broken away; and Fig. 10 is a diagrammatic view showing the arrangement of the track in a barn.

Referring to the drawings, I have illustrated in Fig. 10 a barn of common form, having an entrance at the center of the front wall and having along the rear wall a series of stalls, the said stalls extending on both sides of the center line of the barn. This form of construction is quite common and I have illustrated it because it brings out quite clearly the various capacities of my improved device for different conditions.

It will be readily understood from the following description of my apparatus that when it is used in barns of different sorts, it will be arranged in different ways from that shown, and in many cases certain portions can be conveniently omitted.

Along the rear of the barn, behind the line of stalls and in proper position with reference thereto, I run a track, A, composed of cylindrical bar iron, the said track being supported at its opposite ends by the walls of the barn and placed under such tension as to extend in a substantially horizontal line from one end of the barn to the other. From the back wall of the barn, opposite the door thereof, I run a second track, A$^1$, at right angles to the track, A, said track, A$^1$, extending through the door of the barn and out past a suitable dumping point, to a post, $a$, the outer end of the track, A$^1$, being raised above the rear end thereof, so that the track has a substantial incline. At the point where the tracks, A and A$^1$, cross each other, the track, A, runs beneath the track, A$^1$, for a purpose which will presently be apparent.

Referring now to Fig. 1, it will be seen that the carrier proper is provided with a supporting yoke or frame, B, normally extending longitudinally of the track and in line therewith, said yoke or frame being preferably composed of outwardly-facing channel iron. To the upper corners of the yoke, B, I secure brackets, B$^1$, B$^2$, each of the brackets having projecting perforated lugs, $b$, $b^1$, through which pass bosses, $c$, $c^1$, upon hanger frames, C, C$^1$, respectively. Each of the bosses, $c$ and $c^1$, is provided with a projection, $c^2$, which is adapted to pass through a notch provided in the corresponding upper lug, $b$, when the hanger frame is turned into a position which it can never occupy in use and which will engage with the material of said lug to prevent the removal of the boss upward when the hanger frame is turned into its normal position with respect to the yoke, B. The two hanger frames carry pulleys, C$^2$, which are grooved to ride upon the rails as illustrated in the drawing.

Between the downwardly-projecting ends of the yoke, B, is pivotally secured a trough-shaped container, D, adapted to hold the material to be transported. This container is supported below its center of gravity so that with any ordinary load, when the container is released from the means provided for holding it in an upright position, it will immediately swing into an inverted position by its own weight, so as to dump its contents. For the purpose of supporting the container in its proper position, I pivot between the side flanges of the left hand downwardly-projecting member of the yoke, B, a bell crank lever or catch, E, (Fig. 4), the upwardly-projecting arm of the bell crank lever being provided with a pin $e$, which is adapted to pass through a perforation in the yoke and enter a depression in the wall of the container. The outer end of the bell crank lever or catch, E, is connected pivotally to the lower end of a tripping rod, E$^1$, passing upward through a bracket, $e^1$, in the downwardly-projecting member of the yoke, B, and thence upward through the boss of the corresponding hanger frame. This tripping rod is normally held in its upper position by means of a spring, $e^2$, confined between the bracket, $e^1$, and the shoulder, $e^3$, upon the tripping rod.

Each of the hanger frames carries a pin, F, movable through brackets provided to receive it, and normally spring-pressed toward the pulley rim, so that the distance between the upper end of the pin and the pulley rim is not sufficient to permit the track to pass. By this means I make it impossible for the device to run off the track accidentally, and yet, by merely pulling down the pin, by means of a handle, f, attached thereto, I can separate the pin from the pulley so that the hanger can be removed from the track without difficulty.

It will be understood that in the use of my device it is desirable that the carrier proper, as set forth above, provided with mechanism for releasing the container and with mechanism for holding the hangers in place, must, in practice pass from one end of the track, A, to the other end, so as to be used at both series of stalls; that it must also be capable of moving from the track, A, to the track, $A^1$, so as to reach the dumping point, that means must be provided for operating the tripping rod to dump the container at the proper point. Devices for accomplishing these purposes are provided in my apparatus and I shall now proceed to describe them, having already set forth in detail the construction of the carrier proper, with which they coöperate. The first of these devices which I shall describe is the means by which the carrier is guided from the track, A, to the track, $A^1$, and the means by which it is permitted to pass along the track, A, past the track, $A^1$, when desired. This device may properly be termed a switch construction, although under certain circumstances it is more properly merely a corner construction adapted for the passage of the carrier, and it is illustrated in Figs. 5, 6 and 7. In it I provide a curved, quadrant-shaped track, formed of angle iron, with a vertical web and a horizontal web lying in a horizontal plane on the outside of the curve, the vertical web being brought at its ends into such a position that its upper edge is somewhat above the level of the tracks, A and $A^1$, and that it is just inside said two tracks, so that the tracks are practically tangent to the curve of the quadrant. Two symmetrical switch castings are provided at the ends of the quadrant-shaped track, G, each of the castings comprising a vertical web riveted or otherwise secured, to the outside of the vertical web of the quadrant-shaped angle iron track, a horizontal web, $h^1$, grooved on its lower face to receive the corresponding track, A or $A^1$, an inclined bead, $h^2$, running downward from the vertical web and overhanging the adjacent section of track, A or $A^1$, so as to guide the pulleys from the track to the quadrant, and an upwardly slanting ear, $h^3$, at the end of the horizontal web, $h^1$, the purpose of this ear being to engage the pin, F, as will presently be described. Clamps, $H^1$, are provided upon the quadrant-shaped track, G, said clamps being adapted to engage with the tracks, A and $A^1$, to hold the tracks in suitable engagement, but to permit them to be readily disengaged, as will presently be set forth.

When it is desired to run the carrier from the position shown in Fig. 1, on to the track, $A^1$, it is pushed along in the ordinary way and when the pulley reaches the switch casting, it will ride up upon the inclined bead and the corresponding hanger frame will swivel in its support, permitting the pulley to follow the curve of the switch casting. The upwardly-projecting pins, F, will presently engage the diagonally-disposed ear, $h^3$, upon the horizontal web of the switch casting, depressing said pin to the lower level of the switch casting so that the pin can run along on this lower surface, passing underneath the track, A, to the lower surface of the horizontal web of the angle iron track, where it will run until it passes on to the switch casting at the opposite end of the quadrant, upon which surface it will also run, passing under the track, $A^1$, and the second diagonally-disposed ear, $h^2$. The pulley will thus eventually reach the track, $A^1$, and as soon as it does so the pin, F, will snap up into place, having passed under both the tracks, so as to again hold the pulley firmly in position. It will be understood of course that this same proceeding takes place with both the pulleys of the carrier in succession, as they pass the switch track.

When it is desired to run the carrier from one end of the track, A, to the other, so as to have the carrier pass by the track, $A^1$, the clamp, $H^1$, which secures the switch track to the track, A, is released and the weight of the carrier and its load will depress the center of the track, A, sufficiently to permit the hanger to pass under the track, $A^1$, without interfering.

If it is desired to arrange the track so that the carrier will make a left hand instead of a right hand turn, in passing from the track, A, to the track, $A^1$, the quadrant-shaped switch track can be taken out and reversed in position, the end which was formerly secured to the track, $A^1$, being secured to the track, A, and vice versa. In order to permit the carrier to operate upon a track arranged in this manner, it is necessary to turn the hanger frames through an angle of 180 degrees in order to bring the pins, F, to the outside surface of the curve, so that they can engage the diagonally-disposed ears set forth.

In order to provide for the automatic dumping of the container, I secure to the track, $A^1$, adjacent to the dumping point, a frame, I, yoke-shaped in cross section, the said frame containing a pivoted tripping block, $I^1$, having projections, $i$, adapted to contact with the lower edges of the frame, I. The tripping block, $I^1$, normally occupies the vertical position shown in solid lines in Fig. 8, but when the carrier reaches it and the upper end of the tripping rod, $E^1$, strikes it, it is swung up to the right hand position shown in dotted lines in said figure, whereupon its lower surface becomes a cam which operates to depress the tripping rod and release the container so that the material carried is dumped automatically.

Immediately after the tripping rod has passed the block, $I^1$, the block swings back to the position shown in solid lines in Fig. 8, and, upon the return of the carrier, the block swings up to the left hand position shown in dotted lines in Fig. 8, so as not to interfere in any way with the passage of the carrier. This last feature is particularly advantageous because it is common practice, as I have already set forth, to elevate the end of the track, $A^1$, at the dumping point, the purpose of said elevation being to cause the carrier to return automatically into the barn after it has been dumped. Were the construction of the tripping block such as to interfere in any way, even to a slight extent, with the return of the carrier, the automatic return thereof might be prevented, for in ordinary practice the carrier on its returning movement will pass the tripping block just after it has started its motion and when its momentum is but very small.

In order to start the carrier back in the proper way, I secure to that end of the yoke or frame, B, which will be forward as the carrier emerges from the barn, a spring, J, which is adapted to pass between furcations, $k$, of a cam stop, K, pivoted in a yoke-shaped frame, $K^1$, slidable upon the track, $A^1$.

It will be seen from Fig. 9 of the drawings that the cam stop, K, is so formed that when the spring, J, engages said stop between the furcations thereof, it will swing the same about its pivot in the frame, K¹, and will bring a track-engaging portion, k¹ thereof, into engagement with the track, so as to lock the frame firmly in position with reference to the track, and the stronger the force exerted by the spring, the more firm will be the engagement between the cam stop and the track. In practice the manner of operating the carrier is to move it around the corner to the track, A¹, and then give it a forcible push, which will carry it at considerable speed out upon the track, A¹, causing it to trip automatically as hereinbefore set forth, and dump its contents. Immediately after the carrier has passed the tripping block, the spring will strike the cam stop, K, and arrest the motion of the carrier, any remaining momentum possessed by the carrier being stored in the spring, J, and returned to the carrier in the form of force tending to start it on its return journey into the barn. Inasmuch as the track inclines downward towards the barn, the carrier will run readily back into position, so that the operator need never come out of the barn to dump or return the carrier. The frame, I, carrying the tripping block, I¹, can readily be moved upon the track longitudinally thereon, and no locking means for this frame is necessary because, at the time when the tripping block is operative, the pulley of the carrier is resting upon its upper surface so as to make longitudinal movement of the frame upon the track impossible. A cord or chain, K², is provided, by which the cam stop, K, can be drawn out of engagement with the track and by pulling this cord downwards and exerting through it longitudinal tension with respect to the track, the cam stop can readily be moved. By these two means it is possible to shift the dumping and returning points without any difficulty, so that the carrier can be made to deposit its load in any desired position along the track, A¹.

In order to render it possible to fix the position of the carrier upon the track, A, during the loading operation, I secure to the carrier a hook, L, whose form is clearly shown in Fig. 2. This hook can be passed over the track as shown in Fig. 1, and, inasmuch as the connection between the hook and the carrier frame is attached to the lower portion of the hook, a longitudinal strain on the carrier will cause the hook to bind upon the track so as to make movement of the carrier impossible.

I realize that considerable variation is possible in the details of construction without departing from the spirit of my invention, and I do not intend therefore to limit myself to the specific form herein shown and described.

What I claim as new, and desire to secure by Letters Patent, is—

1. The combination with a track, a frame and pulleys carried by the frame and running upon the track, of a container carried by the frame, a spring mounted upon the frame, and a stop mounted upon the track and adapted to engage the spring to arrest movement of the device upon the track and start it in its return movement, said stop being adjustably mounted upon the track.

2. The combination with a track, a frame, pulleys carried by the frame and running upon the track, and a container mounted in the frame, of a spring carried by the frame, a frame mounted upon the track, and a cam-stop pivoted in the frame and adapted to be engaged by the spring to rotate the cam-stop, said cam-stop being arranged when rotated to bind against the track.

3. The combination with a track, a frame, pulleys carried by the frame and running upon the track, and a container mounted in the frame, of a spring carried by the frame, a frame mounted upon the track, a cam-stop pivoted in the frame and adapted to be engaged by the spring to rotate the cam-stop, said cam-stop being arranged when rotated to bind against the track, and means for manually releasing the cam-stop from its engagement with the track.

4. The combination with two tracks crossing each other, of a frame, pulleys mounted in the frame and running upon one of the tracks, a container carried by the frame and a switching device secured to said two tracks and arranged to be disengaged from one of them to permit said track to move vertically for the passage of the carrier thereon, beneath the other track.

5. The combination with two main tracks at an angle to each other, of a frame, pulleys carried by the frame and running upon the main tracks, a container carried by the frame, an arc-shaped track running from one main track to the other and switch castings connecting the ends of the arc-shaped track with said main tracks.

6. The combination with two main tracks at an angle to each other, of a frame, pulleys carried by the frame and running upon the main tracks, a container carried by the frame, an arc-shaped track running from one main track to the other and switch castings connecting the ends of the arc-shaped track with said main tracks, said switch castings having channels on their lower surfaces to receive said main tracks.

7. The combination with a track, a pulley adapted to run upon the track, and a frame supporting the pulley from one side thereof and extending below the track, of a movable pin upon the opposite side of the frame and adapted to extend upwards into close proximity with the pulley, so as to prevent the passage of the track between the pulley and the pin when the pin is in its advanced position.

8. The combination with two main tracks, pulleys adapted to run upon the tracks, a frame supporting the pulleys from one side thereof, and a pin carried by the frame upon the opposite side thereof, and adjacent to one of the pulleys, said pin being movable and so positioned as, when in its advanced position, to prevent the passage of the track between the pulley and the pin, a switch track connecting said two main tracks, and means whereby said pin is retracted automatically as the corresponding pulley passes from and to the main tracks.

9. The combination with two main tracks, pulleys adapted to run upon the tracks, a frame supporting the pulleys from one side, a longitudinally-movable pin on the opposite side of the frame and extending upward toward the pulley to present a space between its end and the pulley of less width than the width of the track, whereby the passage of the track between the pulley and the pin is prevented when the pin is in its advanced position, a switch track connecting said main tracks, and a cam surface adapted to depress the pin below the lower level of the track, when the pulley passes from and to the main tracks.

10. The combination with two main tracks, pulleys adapted to run upon the tracks, a frame supporting the pulleys from one side, a longitudinally-movable pin on the opposite side of the frame and extending upward toward the pulley to present a space between its end and the pulley of less width than the width of the track, whereby the passage of the track between the pulley and the pin is prevented when the pin is in its advanced position, a switch track connecting said main tracks, and a cam surface arranged to engage the pins to depress them and hold them below the level of said main tracks while the pulley is passing from and to said first named tracks and while it is running upon said switch track.

HENRY L. FERRIS.

In presence of—
 J. H. LANDES,
 R. A. SCHAEFER.